(12) United States Patent
Igaki et al.

(10) Patent No.: US 6,324,051 B1
(45) Date of Patent: Nov. 27, 2001

(54) SOLID ELECTROLYTIC CAPACITOR

(75) Inventors: Emiko Igaki, Hyogo; Masakazu Tanahashi; Chiharu Hayashi, both of Osaka; Yoshiki Hashimoto, Kyoto, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/697,468

(22) Filed: Oct. 26, 2000

(30) Foreign Application Priority Data

Oct. 29, 1999 (JP) .................................................. 11-309280

(51) Int. Cl.[7] ...................................................... H01G 9/00
(52) U.S. Cl. .......................... 361/523; 361/524; 361/529; 361/540; 361/433; 29/25.03
(58) Field of Search ...................................... 361/523, 525, 361/524, 528, 433, 505, 540, 529

(56) References Cited

U.S. PATENT DOCUMENTS

| | | | |
|---|---|---|---|
| 4,017,773 | * 4/1977 | Cheseldine | 361/433 |
| 5,036,434 | * 7/1991 | Kobayashi | 361/540 |
| 5,140,502 | 8/1992 | Kudoh et al. | |
| 5,142,452 | * 8/1992 | Saiki | 361/540 |
| 5,187,649 | * 2/1993 | Kudoh et al. | 361/525 |
| 5,349,496 | * 9/1994 | Taniguchi et al. | 361/528 |
| 5,390,074 | * 2/1995 | Hasegawa et al. | 361/540 |
| 5,621,608 | 4/1997 | Arai et al. | |
| 5,654,869 | * 8/1997 | Ohi et al. | 361/540 |
| 6,128,180 | * 10/2000 | Araki et al. | 361/525 |

FOREIGN PATENT DOCUMENTS

| | | |
|---|---|---|
| 823 719 | 2/1998 | (EP) . |
| 63-269510 | 11/1988 | (JP) . |
| 3-38817 | 2/1991 | (JP) . |
| 3-276621 A | 12/1991 | (JP) . |
| 5-243096 A | 9/1993 | (JP) . |
| 8-213285 A | 8/1996 | (JP) . |
| 8-330191A | 12/1996 | (JP) . |
| 8-339942 | 12/1996 | (JP) . |
| 12-49056 | 2/2000 | (JP) . |

* cited by examiner

Primary Examiner—Dean A. Reichard
Assistant Examiner—Nguyen T Ha
(74) Attorney, Agent, or Firm—Merchant & Gould PC (57) ABSTRACT

A solid electrolytic capacitor includes a capacitor element having an anode of a valve action metal, an oxide film layer formed on the surface of the anode, a solid electrolytic layer formed on the oxide film layer and a cathode electrically connected to the solid electrolytic layer, and also a packaging resin formed to cover the capacitor element. An intermediate layer to relieve stress is arranged in at least one part of the interface between the cathode and the packaging resin. The intermediate layer is deformed and/or peels to relieve stress caused by heat applied while mounting the capacitor element on a substrate.

15 Claims, 5 Drawing Sheets

SOLID ELECTROLYTIC CAPACITOR

BACKGROUND OF THE INVENTION

1. Field of the Invention

The present invention relates to a solid electrolytic capacitor including an anode made of a valve action metal such as aluminum, tantalum or niobium, and also including a solid electrolyte such as a conductive polymer or manganese dioxide.

2. Description of the Prior Art

A typical solid electrolytic capacitor including a valve action metal for an anode is manufactured in the following manner. First, an anode is made of a porous compact of the valve action metal such as a surface-roughened aluminum foil or a porous compact of a sintered powder of a valve action metal such as tantalum or niobium. The entire surface of the porous compact of the valve action metal is covered with a dielectric oxide film. Secondly, a solid electrolytic layer of a conductive polymer such as polypyrrole or manganese dioxide is formed on the surface of the dielectric oxide film, and a cathodic layer of a carbon layer, a silver layer or the like is formed on the solid electrolytic layer. Subsequently, an anodic extraction terminal is attached to an anodic lead by welding or the like, and a cathodic extraction terminal is attached to a cathodic layer with a conductive adhesive or the like. Lastly, the entire element is covered with a packaging resin from which the cathodic extraction terminal and the anodic extraction terminal are partially exposed to the outside. Alternatively, the solid electrolytic layer can be connected electrically with the cathodic extraction terminal without forming a cathodic layer.

Since the packaging resin serves to maintain airtightness from the outside, it should be adhered securely to electrode extraction members at a part to extract terminals from the package. Especially, when the solid electrolyte is a conductive polymer, insufficient airtightness will cause considerable deterioration and thus, the electric properties will be difficult to maintain favorably for a long time. Therefore, for securing the airtightness, the packaging resin is formed generally from an epoxy-based thermosetting resin, using molding (a tip capacitor) or dipping (a lead capacitor).

A solid electrolytic capacitor having a packaging case is also known. Such a capacitor is manufactured by inserting an entire element in a case where a cathodic extraction terminal and an anodic extraction terminal are partially extracted outward, and by sealing the opening of the case with a resin or the like.

A typical solid electrolytic capacitor is mounted onto a substrate by soldering or the like to be used. Due to heating and cooling in the mounting, distortion occurs inside the solid electrolytic capacitor. This distortion is caused by stress due to differences in thermal expansion coefficients between members including the substrate, the solder and a temporary-tacking agent previously formed on the substrate, and the solid electrolytic capacitor, and also differences in thermal expansion coefficients between the respective members inside the solid electrolytic capacitor. A solid electrolytic capacitor of a case-inserting type as disclosed in JP-A-3-276621 can absorb distortion in the inner space. However, for a dipped product as disclosed in JP-A-5-243096 and a molded product as disclosed in JP-A-8-213285, the distortion due to the thermal stress will cause partial peeling inside the solid electrolytic capacitor.

This peeling occurs where the adhesive force (bonding force) is the poorest. In a conventional solid electrolytic capacitor, peeling often occurs in an interface between a solid electrolytic layer and a cathodic layer, or between a solid electrolytic layer and a cathodic extraction terminal. When peeling occurs, efficiency in cathode extraction is lowered and electric properties of the product will deteriorate.

SUMMARY OF THE INVENTION

The present invention provides a solid electrolytic capacitor capable of controlling peeling inside an element at mounting on a substrate.

A solid electrolytic capacitor of the present invention includes a capacitor element and a packaging resin formed to cover the capacitor element, and the capacitor element has an anode of a valve action metal, an oxide film layer formed on the surface of the anode, a solid electrolytic layer formed on the oxide film layer, and a cathode electrically connected to the solid electrolytic layer. The solid electrolytic capacitor is characterized in that an intermediate layer for relieving stress is arranged in at least a part of an interface between the cathode and the packaging resin.

According to the present invention, peeling of the solid electrolytic layer from the cathode can be controlled since stress occurring is relieved in a region where the intermediate layer is formed.

DETAILED DESCRIPTION OF THE INVENTION

The following is an explanation about preferable embodiments in the present invention.

A solid electrolytic layer will be peeled off from a cathode when a solid electrolytic capacitor is mounted on a substrate, because of the difference in the thermal expansion coefficients between the members, specifically between the packaging resin and the capacitor element to be covered with the packaging resin. In other words, tensile stress due to applied heat acts so that the packaging resin having a relatively large thermal expansion coefficient will pull outwards the surface layer of the capacitor element having a small thermal expansion coefficient. This will cause a peeling between the solid electrolytic layer and the cathode because the interface between them has poor bonding force inside the capacitor element. Moreover, shearing stress will act on the interface between the packaging resin and the capacitor element due to the difference in the thermal expansion coefficient or the like. The shearing stress also will cause sliding between the solid electrolytic layer and the cathode, and this will cause peeling. For controlling the peeling, it is requested to relieve these stresses acting on the interface between the packaging resin and the capacitor element.

An intermediate layer is formed to relieve this stress and serves to control distortion occurring due to the stress.

Preferably, by allowing an enlarging gap between a surface of the cathode facing the intermediate layer and a surface of the packaging resin, or by allowing a slip between these surfaces, before relieving the stress by peeling inside the capacitor element, the intermediate layer relieves stress occurring by heat due to the difference in the thermal expansion coefficients of the capacitor element and of the packaging resin.

The intermediate layer can relieve stress by, for example, deforming itself in response to the stress. The deformation of the intermediate layer can be an elastic deformation or a plastic deformation. The deformation can be accompanied by internal breakdown such as delamination inside the intermediate layer. When the response of the intermediate layer to stress is poor, peeling of the solid electrolytic layer from the cathode cannot be controlled sufficiently. Preferably, the intermediate layer is deformed easily by an application of stress smaller than the minimum stress causing a peeling of the solid electrolytic layer from the cathode, so that the stress can be relieved.

For such an intermediate layer, at least either a resin layer or a porous compact is preferably used. There is no specific limitation on the resin layer as long as it is deformed to serve for the purpose of the present invention, though it includes, for example, a rubber layer and a resin layer provided with plasticity. A porous compact will be deformed easily due to voids inside it. Though a metallic porous compact can be used, a preferable porous compact includes resin as the main component. The porous compact can have an asbestos structure (aggregation of fibers having open holes), a pumice structure (having separate open holes), or even a net or mesh structure. A porous compact of a pumice structure can be formed by forming a resin layer containing a dispersed foamable resin powder and by foaming the resin powder. A preferable porous compact is a porous resin layer obtained by foaming a foamable resin powder in a supportive resin layer.

The intermediate layer can be a multilayer including an interface that is peeled easily. This intermediate layer is deformed by the internal delamination and relieves stress.

The intermediate layer can relieve stress also by peeling itself at least in parts from the cathode and/or the packaging resin. In this case, it is preferable that the intermediate layer has a poor bonding force in its interface with at least one selected from the cathode and the packaging resin and that the bonding force is smaller than a bonding force between the solid electrolytic layer and the cathode.

The above-mentioned intermediate layer includes at least one selected from a metal film and a resin film. Preferably, the film lies between the cathode and the packaging resin without any bonding, or it is stuck only partially to the cathode. Considering difficulties in keeping the film at a certain position during formation of the packaging resin, it is more preferable that the film is stuck partially.

Another example of intermediate layers is a layer that is formed by applying at least one selected from an oil and a coupling agent. These materials can be applied directly to the cathode or they can be diluted with a solvent for application and dried subsequently. It is preferable that the oil has a boiling point of not lower than 150° C., since a gas generated by heat raises the internal pressure and may induce peeling. Since thermal treatment is carried out in a relatively short time in a soldering, a rapid gasification will not occur in oil having a boiling point of not lower than 150° C. even if the boiling point is equal to or lower than the mounting temperature (about 230° C.). For a coupling agent, there is no specific limitation for the boiling point of materials before a reaction, since the agent will be coupled to the cathode surface by a chemical reaction. The heat resistance after the reaction is preferably at least 200° C. A silicone oil and a fluorine-containing coupling agent are preferable for the oil and the coupling agent respectively.

A third example of the intermediate layers is a layer including at least one selected from a silicone resin and a fluorine-containing resin. These preferable materials (silicone-based and fluorine-based resins) will serve to provide an intermediate layer that can make the bonding force between the intermediate layer and either the packaging resin or the cathode substantially ignorable.

The relief of stress by the intermediate layer can be accompanied by both deformation and peeling. The deformation and/or peeling can occur only at a part of the intermediate layer. For example, the intermediate layer can be peeled partially if no peeling occurs inside the capacitor element. Even if the stress cannot be relieved sufficiently only by peeling, the purpose of the present invention can be achieved by assisting the relief of stress by using the coincident deformation of the intermediate layer.

As indicated above, when a solid electrolytic capacitor of the present invention is heated for the purpose of mounting on a substrate etc., the capacitor will have a space inside thereof due to peeling in the interface (or inside) of the intermediate layer. This space serves also to relieve internal pressure by a gas generated in the capacitor. It should be especially noted that a solid electrolytic capacitor will have condensation inside when it is left in the air for a long time. If such a capacitor is heated to be mounted on a substrate, moisture in the capacitor will be gasified rapidly and raises the internal pressure of the capacitor, and this will cause peeling. However, spaces provided by peeling and deformation of the intermediate layer can relieve this internal pressure without causing peeling inside the capacitor element.

A solid electrolytic capacitor of the present invention will be described below, referring to the attached drawings.

Figure 1:
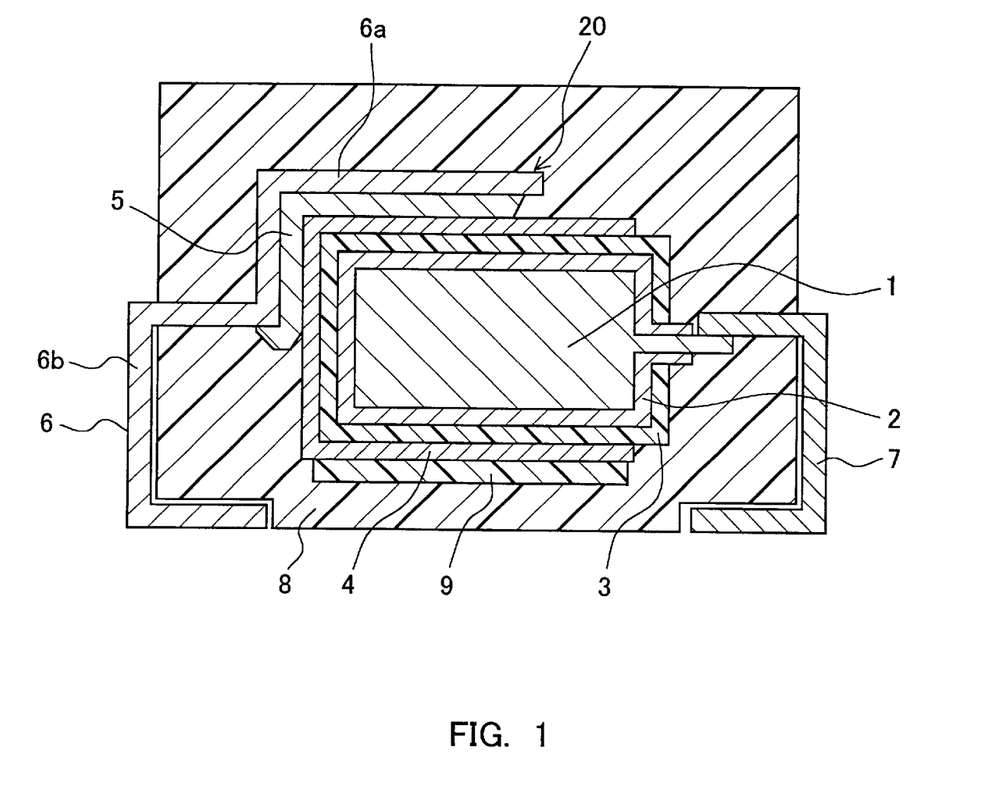
FIG. 1 is a cross-sectional view to illustrate a solid electrolytic capacitor according to the present invention.
Figure 2:
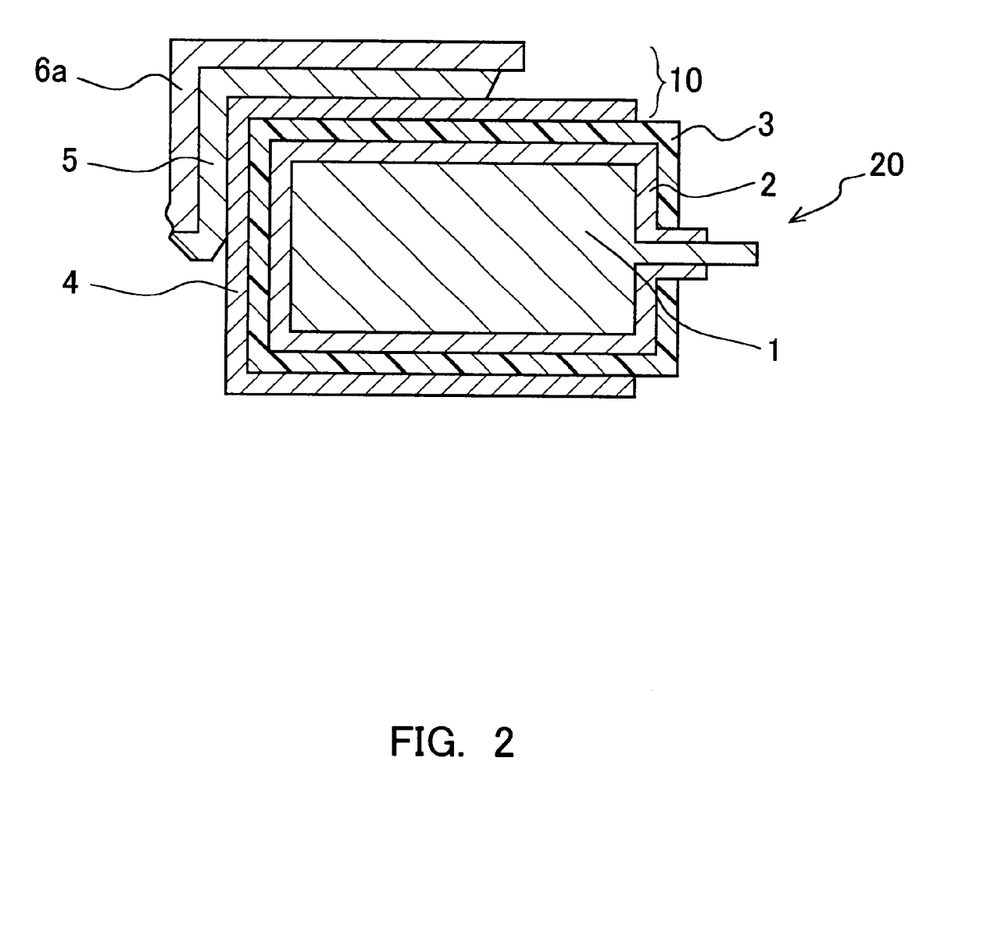
FIG. 2 is a schematic view to illustrate a capacitor element of the solid electrolytic capacitor in FIG. 1.

A solid electrolytic capacitor shown in FIG. 1 includes a capacitor element 20 covered with a packaging resin 8. As shown in FIG. 2, the capacitor element 20 is composed of an anode 1, a dielectric oxide film 2 formed on the surface of the anode, a solid electrolytic layer 3 formed on the dielectric oxide film, and a cathode 10 formed on the solid electrolytic layer.

In this description, a conductive part (a part efficiently functioning as an electrode) arranged on the solid electrolytic layer is defined as a cathode. In the embodiment shown in the drawings, the cathode 10 is composed of three layers: a cathodic layer 4, a conductive adhesive layer 5 and a part 6a of a cathodic extraction terminal 6 (FIG. 2). A part 6b in the cathodic extraction terminal 6 is not considered as a part of the cathode 10, i.e., the part 6b is not defined as a part of the capacitor element, because the part 6b is used only for extracting electrode and does not contribute to power collection from the solid electrolytic layer.

The capacitor element 20 is covered as a whole with a packaging resin 8 excepting a portion where the cathodic extraction terminal 6 (6b) and the anodic extraction terminal 7 are extracted outwards from the capacitor element through the packaging resin 8 in order to secure electroconductivity.

Figure 3:
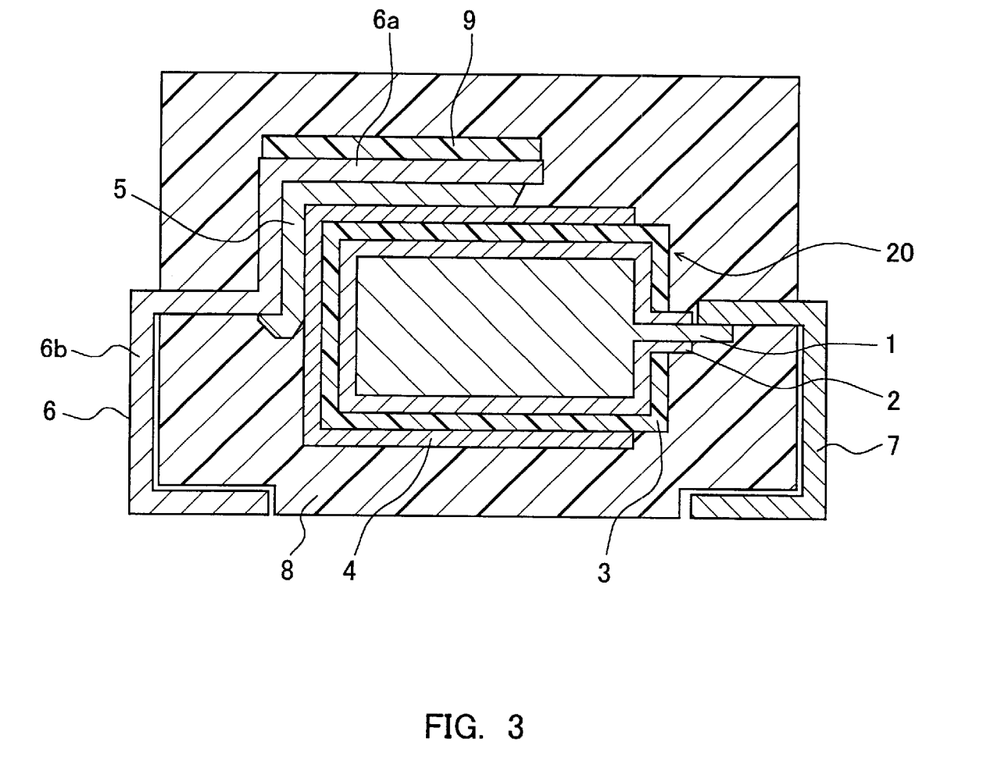
FIG. 3 is a cross-sectional view to illustrate another solid electrolytic capacitor according to the present invention.
Figure 4:
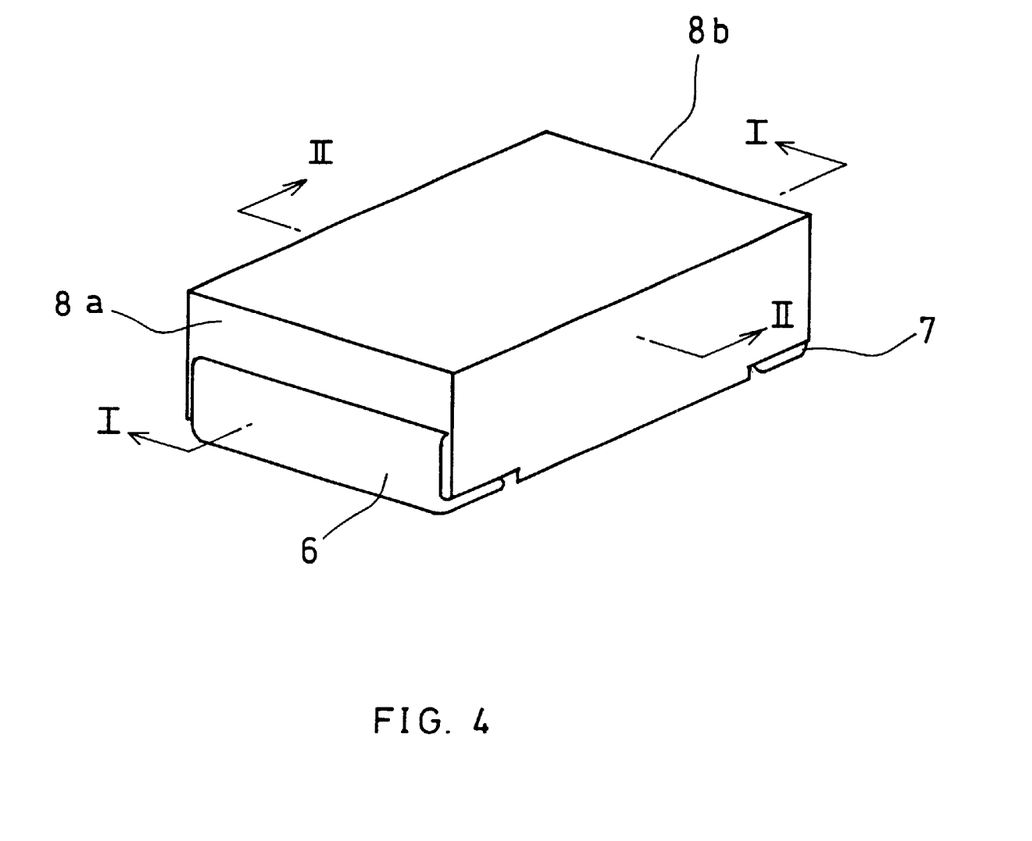
FIG. 4 is a perspective view to illustrate a solid electrolytic capacitor according to the present invention.
Figure 5:
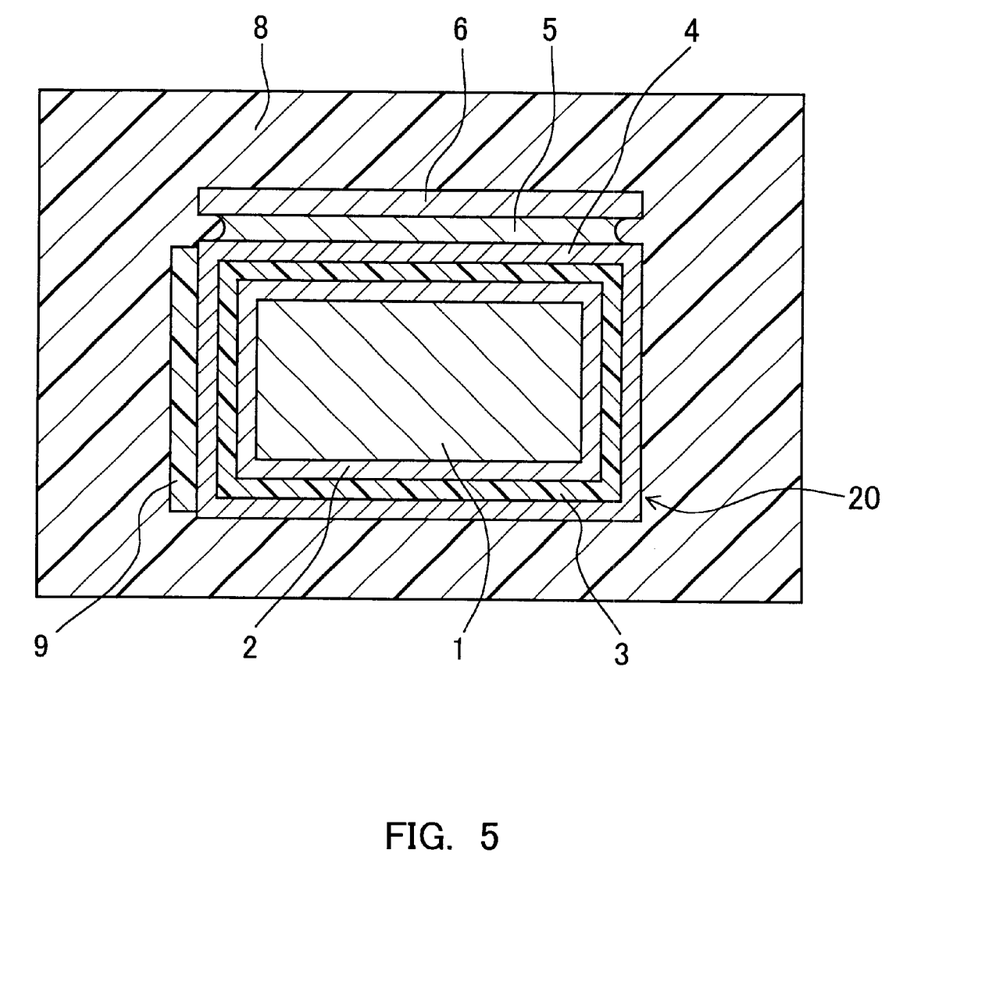
FIG. 5 is a cross-sectional view of the solid electrolytic capacitor in FIG. 4 taken along a line II—II.

An intermediate layer 9 is arranged in a part of an interface between the cathode 10 and the packaging resin 8. The intermediate layer 9, which is arranged to contact with the cathodic layer 4 in FIG. 1, alternatively can be arranged to contact with the cathodic extraction terminal 6a as shown in FIG. 3. Or the intermediate layer 9 can be formed on any surfaces of the cathode not shown in FIG. 1 or FIG. 3. For example, an intermediate layer 9 can be arranged at a position indicated in FIG. 5 showing a cross section taken along a cross direction of the solid electrolytic capacitor (a cross-section taken along a line II—II of FIG. 4 as a perspective view). The intermediate layer 9 is arranged at the left side in FIG. 5, but it can be arranged at the right side or at the both sides. Alternatively, intermediate layers shown in FIGS. 1, 3 and 5 can be combined for use. In such a case, the intermediate layers 9 can be linked with each other at the corners. FIGS. 1 and 3 correspond to the cross section of FIG. 4 taken along a line I—I.

As mentioned above, there is no limitation on a region to form an intermediate layer 9. However, the packaging resin is controlled from expanding in a direction perpendicular to surfaces 8a, 8b in which extraction terminals 6 and 7 are exposed respectively when compared to expansion in any other directions, because the pair of extraction terminals are adhered to the surfaces 8a, 8b. Shearing stress between the capacitor element and the packaging resin in a direction parallel to the surfaces 8a, 8b also is controlled due to the extraction terminals 6 and 7. In such a typical tip capacitor, the anodic extraction terminal and the cathodic extraction terminal are extracted to cover at least partially a pair of opposing outer surfaces of the packaging resin. For such a capacitor, an intermediate layer 9 is preferably formed in at least one part of an interface arranged in a direction substantially perpendicular to the pair of outer surfaces (an interface not parallel to a surface with exposed terminals).

The respective members are further explained in the following.

The anode 1 is made of a valve action metal. Preferably, aluminum, tantalum or niobium can be used for the valve action metal. Though omitted from the drawings, the anode is a porous compact provided with numbers of micro-holes or pores communicating with the outer surface.

When aluminum is used for the anode, an aluminum foil can be roughened by etching or the like to be provided with numbers of micropores. When tantalum or niobium is used, a porous compact can be prepared by press-molding a powder of the valve action metal before sintering. Or the valve action metal powder can be applied as a sheet and sintered to provide a porous compact. These porous compact foils can be rolled or laminated for use.

The dielectric oxide film layer 2 can be formed by anodizing the surface of a porous compact of a valve action metal. Though this is also omitted from the drawings, the dielectric oxide film layer is formed in general on the entire surface of the valve action metal and also on the surface of the micro-pores provided to the porous compact, excepting the anodic lead part for connecting with the anodic extraction terminal.

The solid electrolytic layer 3 can be formed from manganese dioxide or a conductive polymer material. This layer is formed also inside the micro-holes of the porous compact, though this is also omitted from the drawings. Though there is no specific limitation, conductive polymers such as polypyrrole, polyaniline, and polythiophene can be used preferably for the solid electrolyte.

The cathodic layer 4 can be made of a carbon layer, a silver layer or the like, for collecting electric capacity extracted by the solid electrolytic layer. The cathodic layer is formed on the foil surface when the valve action metal porous compact as an anode is composed of a foil. However, when the porous compact is a roll or a laminate of foils, the cathodic layer can be formed on the outer surface of the entire porous compact. When the porous compact is composed of a sintered powder, the cathodic layer will be formed on the outer surface.

The cathodic layer is not an essential element. Depending on the structure and materials, the solid electrolytic layer 3 can be bonded directly to the cathode extraction terminal 6. In this case, a limited region corresponding to the part 6a of the above-mentioned cathodic extraction terminal will be the cathode.

The cathodic extraction terminal 6 is bonded to the cathodic layer in general via a conductive adhesive layer 5 like a silver-based adhesive. When the cathodic extraction terminal is bonded directly to the solid electrolytic layer, the conductive adhesive layer also can be omitted.

The anodic extraction terminal 7 is bonded by welding or the like at the anodic lead part where no dielectric oxide film layers are formed.

The packaging resin 8 covers the capacitor element and seals the entire element excepting where the cathodic extraction terminal 6 and the anodic extraction terminal 7 pass through. An epoxy resin is used preferably for the packaging resin. Preferably, the packaging resin is formed by molding or dipping.

After forming the packaging resin, the extracted terminals are folded in a predetermined direction so that a solid electrolytic capacitor shown in any of the drawing is obtained. An additional external terminal to be connected with the terminals can be provided.

There is no specific limitation for the area to be formed with the intermediate layer, however, the area accounts for preferably at least 10 %, especially at least 25% of the interface between the capacitor element and the packaging resin. Accordingly, stress can be relieved to a sufficient level.

As shown in the drawing, it is preferable to arrange the intermediate layer 9 contacting with the cathodic layer 4 when the cathode includes the cathodic layer 4 as a conductive layer formed on the solid electrolytic layer and the part 6 a of the cathodic extraction terminal bonded to the cathodic layer.

The present invention will be further described below by referring to some examples, though the examples are not intended to restrict the present invention.

Comparative Example

First, for a comparison, a solid electrolytic capacitor was manufactured without providing any intermediate layers.

A tantalum powder was molded with a lead and sintered to form a valve action metal porous compact of 1.4 mm×3.0 mm×3.8 mm. Next, the entire surfaces including the surfaces of the open holes on the porous compact were anodized excepting lead tips with a formation voltage of 30 V in an aqueous solution of phosphoric acid so as to form a dielectric oxide film layer. Subsequently, a solid electrolytic layer of polypyrrole was formed by a chemical oxidative polymerization of a pyrrole monomer on the surface of the dielectric oxide film layer including the inner surfaces of the pores.

A carbon layer and a silver layer were laminated on the solid electrolytic layer applied to the outer surface of the porous compact. These layers serve as cathodic layers. Then, a cathodic extraction terminal is adhered with a silver-based adhesive (a conductive adhesive) to the cathodic layer, while an anodic extraction terminal is bonded by welding to a lead of the porous compact of the valve action metal as an anode. Further, a packaging resin was formed by transfer-molding of an epoxy-based resin. Exposed portions of the cathodic extraction terminal and the anodic extraction terminals were folded so that a solid electrolytic capacitor having an appearance similar to that of FIG. 4 was obtained.

EXAMPLE 1

A solid electrolytic capacitor was obtained in the same way as in the Comparative Example except that a polyisoprene rubber sheet 20 μm in thickness was stuck as an intermediate layer to a part of the cathodic layer surface. The entire rubber sheet was stuck to the cathodic layer with an adhesive. The intermediate layer of the rubber sheet was stuck to a region shown in FIG. 1. This region accounts for about 25% of the interface between the capacitor element and the packaging resin.

EXAMPLE 2

A solid electrolytic capacitor was obtained in the same way as in the Comparative Example except that an epoxy resin film 25 μm in thickness was formed as an intermediate layer in a part of the cathodic layer surface. An oil was applied previously to the epoxy resin to provide plasticity and soften the same. The entire epoxy resin film was stuck to the cathodic layer with an adhesive. Similar to Example 1, the intermediate layer of the epoxy resin film was stuck to a region shown in FIG. 1.

EXAMPLE 3

A solid electrolytic capacitor was obtained in the same way as in the Comparative Example except that a porous resin sheet 50 μm in thickness was arranged as an intermediate layer in a part of the cathodic layer surface. The porous resin sheet was formed by preparing a resin solution by dissolving a butyral resin and dispersing a foamable resin powder in a solvent (butyl acetate), applying the resin solution on the cathodic layer, and further by heating to evaporate the solvent and also to foam the foamable resin powder. The foamable resin powder is made of microcapsules of hydrocarbon with a low boiling point filled in hulls of a thermoplastic resin ("Micropearl" produced by Matsumoto Yushi-Seiyaku; average particle diameter is 10 μm). The resin was heated at 120° C. Similar to Example 1, the intermediate layer of the porous resin sheet was formed in a region shown in FIG. 1.

EXAMPLE 4

A solid electrolytic capacitor was obtained in the same way as in the Comparative Example except that a porous resin sheet 50 μm in thickness was arranged as an intermediate layer in a part of a surface of the cathodic extraction terminal composing a part of the cathode. The porous resin sheet was formed in the same way as in Example 3. The intermediate layer of the porous resin sheet was formed in a region shown in FIG. 3. This region accounts for about 25% of the interface between the capacitor element and the packaging resin.

EXAMPLE 5

A solid electrolytic capacitor was obtained in the same way as in the Comparative Example except that a polyimide film 25 μm in thickness was formed as an intermediate layer in a part of the cathodic layer surface. The polyimide film was stuck to the cathode with an adhesive at only both ends but not over the whole surface. Similar to Example 1, the intermediate layer of the polyimide film was formed in a region shown in FIG. 1.

EXAMPLE 6

A solid electrolytic capacitor was obtained in the same way as in the Comparative Example except that a polyimide film 25 μm in thickness was formed as an intermediate layer in a part of a surface of the cathodic extraction terminal composing a part of the cathode. The polyimide film was stuck to the cathode with an adhesive at only both ends but the surface thereof was not fixed entirely. Similar to Example 4, the intermediate layer of the polyimide film was formed in a region shown in FIG. 3.

EXAMPLE 7

A solid electrolytic capacitor was obtained in the same way as in the Example 6 except that the cathodic extraction terminal and the anodic extraction terminal were folded in a direction opposite to the direction shown in FIG. 3.

EXAMPLE 8

A solid electrolytic capacitor was obtained in the same way as in the Comparative Example except that a silicone resin film 10 μm in thickness was formed as an intermediate layer in a part of the cathodic layer surface. Similar to Example 1, the intermediate layer of the silicone resin film was formed in a region shown in FIG. 1.

EXAMPLE 9

A solid electrolytic capacitor was obtained in the same way as in the Comparative Example except that a silicone oil was applied as an intermediate layer to a part of the cathodic layer surface. Similar to Example 1, the intermediate layer of the silicone oil was formed in a region shown in FIG. 1.

EXAMPLE 10

A solid electrolytic capacitor was obtained in the same way as in the Comparative Example except that a silane coupling agent having a fluorine-modified end was applied as an intermediate layer to a part of the cathodic layer surface. This intermediate layer was formed by applying a solvent (isopropyl alcohol) containing the silane coupling agent of about 3 weight % to the cathodic layer and by heating to evaporate the solvent. The intermediate layer of the silane coupling agent was formed in the region shown in FIG. 1.

EXAMPLE 11

A solid electrolytic capacitor was obtained in the same way as in Example 10 except that the intermediate layer was formed in a region shown in FIG. 5. This region accounts for about 10% of the interface between the capacitor element and the packaging resin.

Equivalent series resistance (ESR) values for the solid electrolytic capacitors obtained in the respective examples were about 30 mΩ.

These solid electrolytic capacitors were fixed at the centers of the bottom surfaces (the sides with folded terminals) to mounting substrates with a setting resin for temporary tacking, and mounted by a solder reflow. In the solder reflow, the total process time including rising-and-falling temperature was determined to be 3 minutes, and retention time at a highest temperature of 230° C. was determined to be 10 seconds. This heat treatment test was carried out for groups of 100 capacitors in the Comparative Example and in every Example, and ESR was measured again after the solder reflow.

The following table shows the number of capacitors in which ratio of R1 (post-reflow resistance) to R0 (initial resistance) was increased to at least 1.5 times but not more than twice, and also the number of capacitors in which the same ratio exceeded twice.

| Samles | $1.5 \leq R1/R0 < 2$ | $R1/R0 \geq 2$ |
|---|---|---|
| Comparative Example | 28 | 40 |
| Example 1 | 6 | 0 |
| Example 2 | 5 | 0 |
| Example 3 | 3 | 0 |
| Example 4 | 11 | 5 |
| Example 5 | 0 | 0 |
| Example 6 | 15 | 8 |
| Example 7 | 12 | 0 |
| Example 8 | 5 | 0 |
| Example 9 | 0 | 0 |
| Example 10 | 0 | 0 |
| Example 11 | 1 | 0 |

These results show that formation of an intermediate layer serves to control deterioration in the electric properties of a solid electrolytic capacitor caused by heat at mounting.

Internal structures of the capacitors after the reflow also were examined. This examination was carried out by implanting the capacitors in a wrapping resin, setting the resin, and observing with a scanning electron microscope (SEM) the samples that were polished to expose the capacitor cross sections. Capacitors having the above ratio (R1/R0) of less than 1.5 times were used for the sample of the Examples. All capacitors were observed for the Comparative Example.

In the capacitors of Comparative Example, many peelings occurred in the interfaces between the solid electrolytic layers and the cathodic layers.

For the capacitors of Examples 1–4, no peeling was found inside the capacitors. It is considered that the deformed intermediate layers relieved stress that would cause peeling of the solid electrolytic layers from the cathodic layers in these capacitors.

In Example 5, peeling was found in the interface between the cathodic layer and the intermediate layer (film), but no peeling was found in the interface between the solid electrolytic layer and the cathodic layer. In Examples 6 and 7, there was peeling between the cathodic extraction terminal and the intermediate layer (film). In Example 8, peeling was observed in both the interfaces between the intermediate layer and the cathodic layer and also between the intermediate layer and the packaging resin. In Examples 9, 10 and 11, there was peeling between the packaging resin and the cathodic layer. Existence of an oil layer and of a layer of silane coupling agent was not confirmed in an observation with a SEM. The reason is considered as that these layers are thin and attached to a peeled surface. In Examples 9–11, however, peeling was confirmed to have occurred at parts where intermediate layers (an oil layer or a coupling agent layer) were formed. It is considered that peeling occurred in the interfaces between the capacitor elements and the packaging resins in Examples 5–11, and the peeling relieved stress that would cause peeling of the solid electrolytic layers from the cathodic layers.

The above results show that a high effect in controlling ESR from rising, i.e., a high effect in controlling peeling inside an capacitor element, was obtained for a capacitor having a peel-able intermediate layer formed to be contacted with the cathodic layer. This tendency will be remarkable especially when a solid electrolytic capacitor has absorbed moisture. The reason is as follows. Internal pressure inside the capacitor element is raised when moisture kept in the solid electrolytic layer is gasified by applying heat. However, this can be relieved by peeling the intermediate layer from the cathodic layer.

In capacitors described in Examples 5 and 9, the intermediate layers will be especially easy to peel off from the cathodic layers. In these capacitors, deterioration in the properties can be controlled even if a gas is generated rapidly from the solid electrolytic layers. Similarly, capacitors having thin intermediate layers with a gas permeability as described in Examples 9 and 10 will have a great ability to control deterioration in the properties even if gases are generated rapidly.

The above results indicate that the direction to fold the extraction terminals also caused a difference in the effect to control peeling. The reason is considered as that a distribution of stress inside a capacitor differs depending on the direction to fold the terminals.

The above-mentioned Examples relate to solid electrolytic capacitors having cathodic layers. However, a similar effect to control peeling was obtained in a solid electrolytic capacitor in which no cathodic layer was formed but a cathodic extraction terminal was bonded directly to a solid electrolytic layer. Though the Examples relate to molded products, similar effects were obtained in dipped products. Furthermore, though the above Examples relate to tantalum solid electrolytic capacitors, similar effects were obtained in aluminum solid electrolytic capacitors or the like. Also, though the above solid electrolytic capacitors relate to solid electrolytic capacitors including polypyrrole as a solid electrolyte, some other solid electrolytes can provide similar effects.

Though the above Examples relate to effects of solid electrolytic capacitors configured as shown in the drawings, the structures are not limited thereto. For example, similar effects are obtainable for a capacitor in which both the extraction terminals are extracted in the same direction. In this case, a pair of extraction terminals will not limit the opposing surface of the solid electrolytic capacitor, and thus, the opposite surface will be subject to an influence of heat and expansion. Therefore, considerable effects can be obtained if an intermediate layer is provided to a capacitor element surface parallel to the surface opposite to the extraction terminals.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A solid electrolytic capacitor comprising:
    a capacitor element having an anode of a valve action metal, an oxide film formed on the surface of the anode, a solid electrolytic layer formed on the oxide film layer, and a cathode electrically connected to the solid electrolytic layer; and
    a packaging resin formed to cover the capacitor element, wherein an intermediate layer for relieving stress is arranged in at least a part of an interface between the cathode and the packaging resin.

2. The solid electrolytic capacitor according to claim 1, wherein the intermediate layer can be deformed by applying stress that is smaller than the minimum stress that causes peeling between the solid electrolytic layer and the cathode so as to relieve the stress.

3. The solid electrolytic capacitor according to claim 1, wherein the intermediate layer is at least one selected from a resin layer and a porous compact.

4. The solid electrolytic capacitor according to claim 3, wherein the porous compact is a porous resin layer obtained by foaming a foamable resin powder in a supportive resin layer.

5. The solid electrolytic capacitor according to claim 1, wherein the intermediate layer has a bonding force that is smaller than a bonding force between the solid electrolytic layer and the cathode in the interface between the intermediate layer and at least one selected from the cathode and the packaging resin.

6. The solid electrolytic capacitor according to claim 5, wherein the intermediate layer comprises at least one selected from a metal film and a resin film.

7. The solid electrolytic capacitor according to claim 6, wherein the intermediate layer is stuck only partially to the cathode.

8. The solid electrolytic capacitor according to claim 5, wherein the intermediate layer is formed by applying at least one selected from an oil and a coupling agent.

9. The solid electrolytic capacitor according to claim 8, wherein the intermediate layer is formed by applying at least one selected from a silicone oil and a fluorine-containing coupling agent.

10. The solid electrolytic capacitor according to claim 5, wherein the intermediate layer contains at least one selected from a silicone resin and a fluorine-containing resin.

11. The solid electrolytic capacitor according to claim 1, wherein the intermediate layer is arranged in a region accounting for at least 10% of the interface between the capacitor element and the packaging resin.

12. The solid electrolytic capacitor according to claim 1, wherein the cathode includes a cathodic layer as a conductive layer formed on the solid electrolytic layer and also a part of the cathodic extraction terminal connected to the cathodic layer, and the intermediate layer is arranged contacting with the cathodic layer.

13. The solid electrolytic capacitor according to claim 1, further comprising an anodic extraction terminal connected to the anode and a cathodic extraction terminal connected to the cathode, and the anodic extraction terminal and the cathodic extraction terminal are extracted onto a pair of opposing outer surfaces of the packaging resin, and an intermediate layer is arranged in at least one part of an interface arranged to be substantially perpendicular to the pair of outer surfaces.

14. The solid electrolytic capacitor according to claim 1, wherein the solid electrolytic layer contains a conductive polymer.

15. A solid electrolytic capacitor provided by heating the solid electrolytic capacitor according to claim 1 so that peeling occurs in the interface between the capacitor element and the packaging resin in at least a part of the region in which the intermediate layer is arranged.

* * * * *